Nov. 29, 1949  G. R. LAURE ET AL  2,489,966
INFUSION DEVICE
Filed May 21, 1945
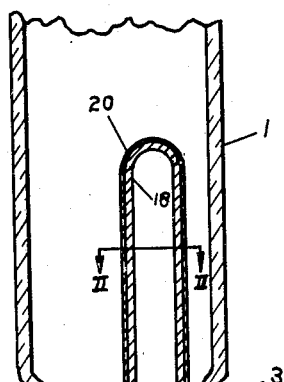
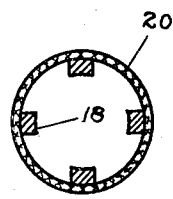
Fig. 2
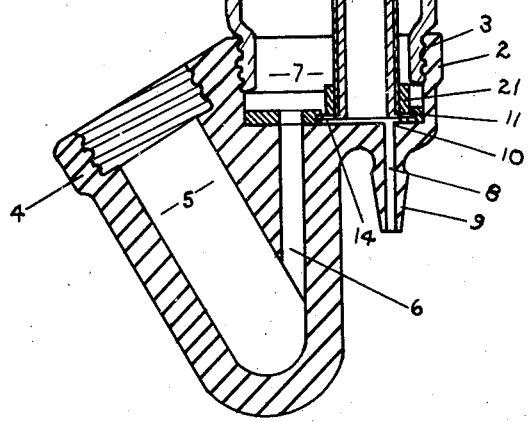
Fig. 1
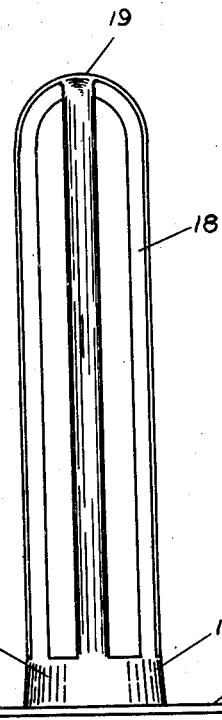
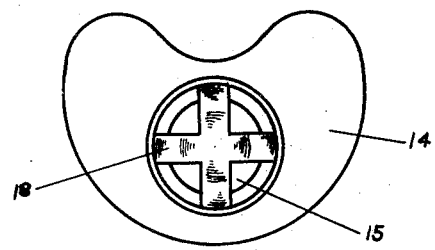
Fig. 4     Fig. 3
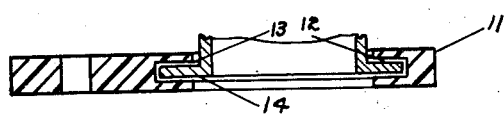
Fig. 5
INVENTORS
GEORGE R. LAURE
LEONARD T. COOKSON
BY
ATTORNEY Patented Nov. 29, 1949

2,489,966

UNITED STATES PATENT OFFICE 2,489,966

INFUSION DEVICE

George R. Laure and Leonard T. Cookson, Kalamazoo, Mich., assignors to The Upjohn Company, Kalamazoo, Mich., a corporation of Michigan Application May 21, 1945, Serial No. 594,976

1 Claim. (Cl. 210—164)

This invention relates to a blood infusion device and particularly to a type thereof having an improved filter.

In the process of infusing blood into the body of a patient it is necessary to provide a filter between the blood supply and the tube leading the blood to the body of the patient. Although all solid particles must be prevented from entering the body of the patient, this filter is needed primarily for holding back clots which may have formed in the blood supply during storage or which may form in it during the infusion process. In present practice this filtering is commonly done either by an ordinary screen filter, or by an ordinary screen filter supplemented by a number of glass beads placed above it. The screen filter acting alone is not satisfactory since it very quickly becomes choked with blood clots so that the flow of blood is undesirably diminished and sometimes cut off altogether. Placing a number of glass beads above the screen works reasonably well, for the clots are usually caught by the beads while the blood flows on through, and thus the screen filter is protected from becoming closed by the clots. This, however, is also unsatisfactory since the beads are difficult to clean, are often lost when the equipment is cleaned after an infusion and are generally inconvenient to handle.

It is therefore desirable to provide a filter which can be used with the type of equipment here concerned, which will safely and accurately filter out any solid particles in the blood supply, and especially clots forming therein, and yet permit continuous flow of the liquid portion thereof, and which can be easily cleaned without inconvenience or likelihood of loss.

Therefore, the principal object of our invention is to provide infusion equipment including a filter which will accurately filter out all clots forming within the blood but permit the continuance of free flow of the liquid portions of the blood.

A further object of our invention is to provide infusion equipment having a filter which can be easily cleaned or replaced without inconvenience and without the likelihood of loss of the filter.

A further object of our invention is to provide infusion equipment having a filter which is sufficiently prominent and attention-arresting that it will substantially diminish the likelihood of its being omitted when the equipment is assembled for an infusion.

Other objects and purposes of our invention will be apparent to those acquainted with equipment of this type upon the reading of the following specification and examination of the accompanying drawings.

In the drawings:

Figure 1 shows a central section of standard infusion equipment fitted with our improved filter.

Figure 2 is a section taken on the line II—II of Figure 1.

Figure 3 is a detail side view of the supporting means for the filter sack.

Figure 4 is a top view of the supporting means for the filter sack.

Figure 5 is an enlarged detail in central section of the gasket and the lower end of the supporting means for the filter sack.

In effecting the objects and purposes above pointed out, we have provided a filter which can be used with standard infusion equipment without change or modification therein. Our improved filter comprises a supporting frame, a flexible filtering sack of material chemically inert to blood and any suitable means holding said sack in position on said support. By causing the filter sack to extend from the outlet of the blood reservoir a substantial distance into said reservoir there is provided ample room for all of the clots within the said reservoir, or which are likely to form therein, to collect around the base of the filter sack and still leave ample filtering area to pass the liquid portion of the blood.

Referring now to the figures, there is shown a reservoir 1 discharging into a receiver 2 with which it is engaged by suitable threaded members 3. Associated with the receiver 2 is a flow controlling well 4 having therein an opening 5 the lower end of which is connected by a passageway 6 to the chamber 7 within the receiver 2. From the chamber 7 there extends the outlet passageway 8 and this is normally provided with a suitable nipple 9 for the engagement of a tube (not shown), which conveys the blood from the supply reservoir to the infusion needle.

The chamber 7 has a substantially flat bottom 10 against which lies a suitable gasket 11 which is held therein in any convenient manner, as frictionally. This gasket (Figure 5) is normally made of plastic or rubber, and has a central opening 12 in register with the outlet 8. The walls of said central opening have a recess 13 for the reception of a base plate 14 of the mounting frame.

Referring now particularly to Figures 3 and 4, there is shown a mounting frame provided for the filter sack. There is first provided a relatively thin base plate 14, already mentioned as inserted into the recesses in gasket 11. Within the base plate 14 is a central opening 15 positioned to be in register with the outlet 8 when the filter is in its operative position. Surrounding the opening 15 and extending upwardly from the plate 14 is a nipple 16 having upwardly tapered sides 17. Extending upwardly from the nipple 16 are a plurality of frame webs 18. As shown in the drawing these are four in number and meet at the top 19.

The filter sack 20 is made of such size and shape as to extend over the frame composed of the frame members 18 to envelop the entirety thereof including the nipple 16. A holding ring 21 extends around the filter sack 20 and grips it tightly against said nipple 16. By providing the taper indicated for said nipple, the ring 21 will enter onto the nipple easily but will grip the sack tightly thereagainst when said ring is pushed to its full downward position.

The filter sack is made from any fabric which can be woven sufficiently closely to provide an effective filter, but which is chemically inert to blood so that it will not contaminate the blood in any way. A closely woven fabric of one of the polyamides commercially known as "nylon" is highly satisfactory, although other fabrics, such as tightly woven filaments of one of the polyvinyl or vinylidene chlorides commercially known as "Saran" will be equally suitable.

In operation the supporting plate 14 is inserted into the recesses of the standard gasket 11 as shown and placed at the bottom of the chamber 7. The filter sack 20 is slipped over the frame and fastened into holding position by the ring 21 as above described. The rest of the equipment is then assembled and operated in the usual manner. The blood clots will tend to collect around the bottom of the filter but this will still leave the top clear for permitting passage of the liquid portion of the blood. When a particular infusion is completed and the equipment is to be cleaned there will be no danger of an attendant or nurse inadvertently throwing the filtering equipment down a drain, such as often happens when beads are used, but the filtering portion, namely the sack, can be readily removed and either washed or replaced as needed. Further, the filtering means herein described and illustrated are sufficiently large and prominent that in assembling the equipment in preparation for an infusion there is no likelihood that the filter or the filter sack will be omitted, as sometimes happens with beads due to forgetfulness of a nurse or attendant.

Accordingly, we have disclosed and described equipment capable of meeting the objectives and purposes above named. Certain variations will be at once apparent to those acquainted with equipment of this type but these variations will be included within the scope of our hereinafter appended claim excepting as said claim may expressly provide otherwise.

We claim:

A filter device for insertion into a cup shaped receptacle having an outlet opening through the bottom thereof comprising the combination: a gasket within said receptacle, frictionally engaging its walls, and having a passage opening in register with said outlet opening and grooves extending into the walls defining said passage opening; a base-member received within said grooves and having an opening therethrough in register with said passage opening; a tapered nipple extending from said base member and surrounding said outlet opening; a plurality of spaced frame members extending from the edge of said nipple remote from said base, having their outer surfaces each a smooth continuation of the outer surface of said nipple, said members joining at their ends remote from said base by portions curved on a radius one half their distance apart at the beginning point of such curvature and said portions having their outer surfaces defining a common hemispherical surface in the region of such joining; a removable flexible bag of polyamide fabric material over said frame members and lying tightly against same with its open end surrounding said nipple; a holding ring surrounding the open end of said bag and removably holding it tightly against said nipple.

GEORGE R. LAURE.
LEONARD T. COOKSON.

REFERENCES CITED

The following references are of record in the file of this patent:

UNITED STATES PATENTS

| Number | Name | Date |
|---|---|---|
| 361,489 | Cornish et al. | Apr. 19, 1887 |
| 483,847 | Jaeger | Oct. 4, 1892 |
| 633,368 | Riddick | Sept. 19, 1899 |
| 863,813 | Tyler | Aug. 20, 1907 |
| 868,255 | Disbrow | Oct. 15, 1907 |
| 872,437 | Leonard | Dec. 3, 1907 |
| 1,207,593 | Miller | Dec. 5, 1916 |
| 1,585,418 | Rosenberg | May 18, 1926 |
| 1,652,423 | Belke | Dec. 13, 1927 |
| 1,898,382 | Mullaney | Feb. 21, 1933 |
| 2,161,766 | Rugeley et al. | June 6, 1939 |
| 2,186,987 | Nasset | Jan. 16, 1940 |
| 2,212,318 | Gee | Aug. 20, 1940 |
| 2,222,123 | Schwab | Nov. 19, 1940 |
| 2,232,153 | Vohrer | Feb. 18, 1941 |
| 2,252,554 | Carothers | Aug. 12, 1941 |
| 2,315,109 | Cutter | Mar. 30, 1943 |
| 2,329,987 | Goodlow | Sept. 21, 1943 |
| 2,341,114 | Novak | Feb. 8, 1944 |
| 2,418,247 | Dalzell | Apr. 1, 1947 |
| 2,464,496 | Gee | Mar. 15, 1949 |

OTHER REFERENCES

"A Nylon Blood and Plasma Filter," by S. Brandt Rose; published in Science, vol. 98, No. 2534, July 23, 1943.